United States Patent [19]

Rose et al.

[11] Patent Number: 4,735,647
[45] Date of Patent: Apr. 5, 1988

[54] APPARATUS FOR REMOVING MOLTEN GLASS FROM A MOLTEN BATH THEREOF

[75] Inventors: Dieter Rose, Kronach; Werner Bassing, Marktrodach, both of Fed. Rep. of Germany

[73] Assignee: J. Walter Co. Maschinen GmbH, Fed. Rep. of Germany

[21] Appl. No.: 33,419

[22] Filed: Apr. 1, 1987

[30] Foreign Application Priority Data

Apr. 12, 1986 [DE] Fed. Rep. of Germany ....... 3612390

[51] Int. Cl.$^4$ ............................................. C03B 35/00
[52] U.S. Cl. ........................................ 65/207; 65/221; 65/222; 65/304; 65/352
[58] Field of Search ................. 65/207, 210, 211, 212, 65/221, 222, 260, 304, 352

[56] References Cited

U.S. PATENT DOCUMENTS

| | | | |
|---|---|---|---|
| 1,885,660 | 11/1932 | Waugh | 65/212 X |
| 1,979,661 | 11/1934 | Bethel | 65/211 |
| 1,986,765 | 1/1935 | Smith | 65/211 |
| 2,983,077 | 5/1961 | Olson | 65/212 |
| 3,154,809 | 11/1964 | Fischer | 65/221 X |

FOREIGN PATENT DOCUMENTS

| | | | |
|---|---|---|---|
| 3139674 | 4/1983 | Fed. Rep. of Germany. | |
| 470504 | 8/1975 | U.S.S.R. | 65/260 |

OTHER PUBLICATIONS

Schroder, *Der Mechanische Anfanger, Teil IV*, vol. 117, No. 11, "Sprechsaal" 1021 (1984).

*Primary Examiner*—Robert L. Lindsay
*Attorney, Agent, or Firm*—Lerner, David, Littenberg, Krumholz & Mentlik

[57] ABSTRACT

In an apparatus for removing molten glass from a bath through a taphole in the wall of a vessel containing the bath, and transporting the molten glass to a processing station, a lance can be moved through the taphole and dipped into the molten glass to pick up glass with the tip portion of the lance. The lance is connected to a connecting element of an operating arrangement by first pivot means and the connecting element is mounted on a support of the operating arrangement by a second pivot spaced from the first pivot. The two pivots have mutually parallel horizontal axes and, to provide for unimpeded pivotal movement of the lance about the first pivot and of the connecting element about the second pivot, the pivots are displaced relative to each other such that the lance is pivotable in a first vertical plane and the connecting element is pivotable in a second vertical plane which is spaced from the first vertical plane. The connecting element carries a drive motor for the pivotal movement of the lance and the support carries a drive motor for the pivotal movement of the connecting element.

9 Claims, 3 Drawing Sheets

APPARATUS FOR REMOVING MOLTEN GLASS FROM A MOLTEN BATH THEREOF

BACKGROUND OF THE INVENTION

The present invention is concerned generally with an apparatus for removing molten glass from a molten bath thereof, and transporting the molten glass removed from the bath to another station such as a glass processing station.

Glass Technology, volume 23, No 2, April 1982, pages 80 to 89, discloses an apparatus for taking molten glass from a melt or molten bath thereof, which is separated from a processing station by a wall structure having a taphole therein, and for transporting the molten glass removed from the bath to the processing station. That publication, in FIG. 7 therein, discloses such an apparatus having a lance which can be moved through the taphole and which can dip into the molten bath, with the leading end portion of the lance. The lance is mounted by way of a pivot arrangement on a connecting element of a motion-producing or drive unit. The connecting element is mounted to the drive unit by means of a second pivot which is spaced from the first pivot. Both the first and the second pivots in that arrangement are pivotable about horizontal axes which are parallel to each other, but the angle of pivotal movement of the lance relative to the connecting element and the angle of pivotal movement of the connecting element relative to the drive unit are limited. The fact that those angles of pivotal movement are limited in that fashion means that the position in respect of height of the processing station, which is disposed at a spacing from the taphole of the vessel containing the molten bath, relative to the surface of the molten bath in that vessel, is limited to lying in a relatively small range.

Another disadvantage of that design configuration is that, besides the above-mentioned pivotal movement, the connecting element is also required to perform a translatory movement relative to the drive unit in order to be able to take a given amount of glass from the molten bath by means of the lance, and in order not to limit to an excessively small area the region which is referred to as the drop-off or discharge region, namely the region within which the glass picked up by the lance from the molten bath can be dropped off or discharged, and also being the region within which at least one processing station is disposed. In such an apparatus, components which move with a translatory motion are a matter of disadvantage because the individual parts of such equipment can be exposed to relatively high temperatures as dictated by the molten glass in the bath, so that it is not possible reliably to prevent rusting, scaling and the like. Accordingly, components which only perform a pivotal movement relative to each other give rise to fewer problems because they can be better protected from the effect of elevated temperatures by screening means which are simple to install, in comparison with components which perform a translatory movement relative to each other.

German published specification (DE-AS) No. 29 05 767 also discloses an apparatus for taking molten glass from a molten bath thereof, wherein the lance is pivotable about a pivot and is movable with a translatory movement in the radial direction of the pivot, thus suffering from the disadvantages discussed above, which are to be found in an arrangement involving translatory movements.

SUMMARY OF THE INVENTION

An correct of the present invention is to provide an apparatus for removing molten glass from a bath and transporting it to a processing station, which does not involve translatory movements between adjacent components of the apparatus.

Another object of the present invention is to provide an apparatus for taking molten glass from a molten glass bath and transporting it to a glass processing station, which is of a simple construction but nonetheless permits the lance to have a relatively long operating range for transportation of the glass to the station.

Still another object of the present invention is to provide an apparatus for taking glass from a molten bath and transporting it to another station, which permits flexible and accurate control of the movements required to pick up and transfer the glass.

In accordance with the present invention, those and other objects are achieved by an apparatus for removing molten glass from a molten bath thereof which is separated from a glass processing station to which the glass is to taken, by a wall having a taphole therein, and for transporting the molten glass removed from the bath to the processing station. The apparatus comprises a lance adapted to be moved through the taphole to have access to the molten bath, with the lance having a front end portion adapted to be dipped into the molten bath to pick up glass therefrom. A motion means or drive unit has a connecting element to which the lance is connected by way of a first pivot, with the connecting element being mounted to the drive unit by way of a second pivot disposed at a spacing from the first pivot. The first and second pivots have at least substantially parallel horizontal axes of pivotal movement. The first and second pivots are displaced relative to each other in the direction of their said horizontal axes in order to provide for unimpeded pivotal movement of the lance about the horizontal axis of the first pivot and of the connecting element about the second pivot, whereby the lance is pivotable in a first vertical plane and the connecting element is pivotable in a second vertical plane spaced from the first vertical plane. The second pivot by which the connecting element is operatively connected to the drive unit is disposed on a support means in front of the taphole and at a level differing therefrom, namely above or below the taphole. The drive unit further includes a first drive motor disposed on the connecting element and operable to pivot the lance relative to the connecting element, and a second drive motor carried on the support means, for pivoting the connecting element relative to the support means.

The above-indicated arrangement of the lance and the connecting element, in the manner of a crank drive configuration, permits the lance to dip into the molten bath by passing through a taphole of comparatively small area, as well as permitting the lance to be moved out of the molten bath through the taphole to a glass processing station, while the processing station can be positioned within a drop-off or discharge region which is of comparatively large area. Because the apparatus according to the invention has the first and second pivots about which the lance and the connecting element respectively are pivotable, that arrangement does not involve any translatory movements between components of the apparatus so that in comparison with the above-discussed known apparatus, the operating life of the apparatus can be substantially increased because it is possible to avoid scaling, rusting and the like of the components which move relative to each other.

Other advantages of the apparatus in accordance with the principles of this invention lie in the simplicity of structure thereof, the simplicity of control of the connecting element and the lance which is pivotally connected thereto and above all the point that the components which move relative to each other can be provided with an encapsulation to provide protection from fouling and thus to provide the possibility of affording satisfactory lubrication without giving rise to serious problems.

In accordance with the invention, it is also possible for the processing station to be arranged above the taphole, with the lance nonetheless being disposed at a sufficiently downwardly inclined angle for the molten glass to be able to drop off the tip or end portion of the lance. Furthermore, if the surface of the molten glass bath is at an extremely low level, the apparatus according to the invention does not require a shaft member, as was required in the above-discussed known arrangement, and which is variable with a translatory movement in the vertical direction to alter the length thereof and which would be required to feed glass to processing stations disposed at a higher level than the surface of the molten glass bath. By suitable control of the connecting element and the lance it is also possible for the tip of the lance to perform a translatory movement during the operation of dropping the glass off at the processing station, by suitable angular movements of the first and second pivots. In other words, appropriate pivotal movement of the first and second pivots can produce the same effect as a translatory component by suitably displacing the tip of the lance along an at least generally straight path. That may be an aspect of significance, in particular in regard to the production of elongate glass articles. The apparatus according to the invention involves reduced maintenance, level of costs and susceptibility to trouble, by virtue of its design configuration as set forth above.

In accordance with the invention, the second pivot is arranged on the support means in front of and either above or below the taphole provided in the wall separating the molten bath from the glass processing station. Arranging the second pivot above the taphole is advantageous particularly when the processing station is disposed above the surface of the molten glass bath.

In a preferred embodiment of the apparatus according to the invention, the support means for the second pivot may be stationary. In that case the drop-off or discharge region at which the glass is discharged from the lance to the processing station is determined solely by the length of the lance and the length of the connecting element and the distance of the support means from the wall containing the taphole.

In another embodiment of the apparatus according to the invention, the support means may be displaceable relative to the taphole. Such displaceability of the support means towards or away from the taphole means that the maximum size of glass drop-off or discharge area is increased by an amount corresponding to the distance over which the support means is linearly displaceable with respect to the taphole.

The support means of the apparatus according to the invention may also be rotatable about a vertical axis. It will be appreciated that it is also possible for the support means to be so arranged as to be both linearly displaceable and also rotatable about a vertical axis. In that last-mentioned case, the glass drop-off or discharge region is at its maximum, so that it is also possible to provide a plurality of processing stations in association with one taphole, the processing stations being arranged for example in the form of a rotating magazine or turret-like unit.

In accordance with the invention, as stated, a drive motor is disposed on the connecting element and is operable to produce pivotal movement of the lance relative to the connecting element. That arrangement provides that the connecting element can serve at the same time as a screening or shielding means for the drive motor, so that the drive motor is thereby protected from the radiant heat that issues through the taphole. A further advantage of arranging the drive motor on the connecting element for pivoting the lance relative thereto is that the torque-transmitting connection between the drive motor and the lance is thus short and there is a good dynamic performance as between the lance and the drive motor associated therewith.

The lance may be arranged in such a way as to be capable of rotating about its longitudinal axis. A further drive motor may be disposed on the connecting element, to produce that rotary movement of the lance about its longitudinal axis. That arrangement provides that the drive motor for thus rotating the lance is also protected from the radiant heat issuing from the taphole while that design configuration of the apparatus according to the invention, besides giving a good dynamic characteristic which can be easily controlled, also provides the advantage of affording the apparatus a long operating life, thereby minimising maintenance work and expenditure.

A similar point applies in regard to the drive motor provided for pivoting the connecting element relative to the support means, that motor also being disposed on the support means, such that it can be adequately protected from the radiant heat from the taphole, by a suitable configuration of the connecting element.

Further objects, features and advantages of the present invention will be apparent from the following description of a preferred embodiment thereof.

DESCRIPTION OF THE PREFERRED EMBODIMENT

Figure 1:
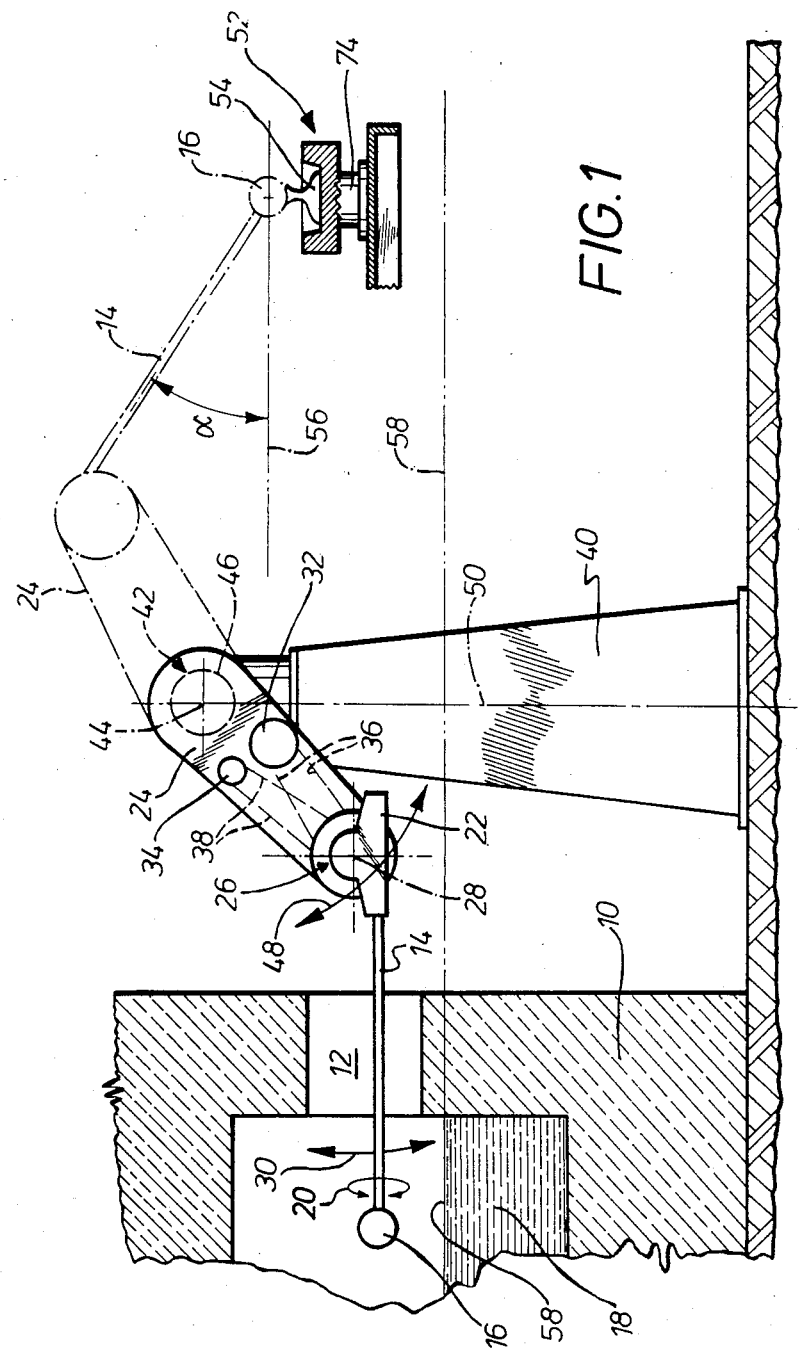
FIG. 1 is a side view of the apparatus, showing part in sectional view of the wall with the taphole therethrough and the molten glass bath, as well as a processing station.

Referring firstly to FIG. 1, shown therein is part of a wall 10 of a glass melting furnace which contains a glass melt or molten bath as indicated at 18. The wall 10 is provided with a taphole 12 therethrough, through which a lance 14 can be passed in such a way that the ball-shaped tip end portion 16 thereof can be dipped into the molten glass bath 18 in the glass melting furnace. In FIG. 1, the lance is illustrated in a horizontal position in which it has been passed through the taphole 12 into the interior of the furnace but has not been dipped into the molten glass 18. It will be appreciated that the lance 14 can be dipped into the molten glass by downward movement as indicated by the double-headed arrow 30 which thus represents the upward and downward pivoting movement of the lance 14. The lance 14 can also be rotated about its longitudinal axis, as indicated by the double-headed arrow 20.

At its end portion which is remote from its tip 16, the lance 14 is carried in a fixing member 22 which is connected to a connecting element 24 by means of a first pivot as indicated generally at 26. The pivot 26 has a horizontal axis 28 so that, as indicated above, the lance 14 can be pivoted relative to the connecting element 24 about a horizontal axis and thus in a vertical plane, as indicated by the double-headed arrow 30.

To produce the pivotal movement of the lance 14 about the horizontal axis 28, the apparatus has a first drive motor 32 which is arranged on the connecting element 24 and which is protected or screened by the connecting element 24 from heat radiation from the taphole 14.

To provide for rotary movement of the lance 14 about its longitudinal axis as indicated by the double-headed arrow 20, the apparatus further has a second drive motor 34 which is arranged on the connecting element 24, like the first drive motor 32, adjacent thereto. That arrangement of the drive motor 34 means that there is no need for moving cables and a unit which is often referred to as a cable check arrangement, as would be necessary if the apparatus provided a central stationary drive assembly for the lance 14. When consideration is given to the high levels of thermal loading which may be involved and the bending loadings and material fatigue phenomena which occur in regard to moving cables, it will be seen that the apparatus according to the invention can provide for a reduction in maintenance and in its susceptibility to trouble and breakdown.

Reference numerals 36 and 38 in FIG. 1, indicating broken lines therein, designate suitable connecting members such as toothed belts, V-belts or the like, which provide the drive communications between the respective drive motors 32 and 34 and the associated components for producing the pivotal movement of the lance 14 about the connecting element 24 and for producing the rotary movement of the lance 14 about its longitudinal axis.

The connecting element 24 is mounted to a support 40 by means of a second pivot 42 which has a horizontal axis of pivotal movement as indicated at 44. The axis 44 is arranged parallel to the horizontal axis 28 of the first pivot 26 and is at a defined spacing therefrom.

The support 40 carries a third drive motor as indicated diagrammatically at 46, for rotating the connecting element 24 about the horizontal axis 44 in the direction indicated by the double-headed arrow 48.

In the illustrated embodiment, the support 40 is in the form of a stationary pillar or column but it will be appreciated that it is also possible for the support 40 to be displaced with a linear movement along a suitable guide means towards and away from the wall 10 with the taphole 12 and/or to be rotated about a vertical axis as indicated at 50 in FIG. 1.

Referring still to FIG. 1 and the lance 14 and connecting element 24, the dash-dotted line configuration thereof represents a limit position in respect of the movement of the lance 14 and the connecting element 24, in which the connecting element 24 points inclinedly upwardly towards the right in FIG. 1 while the lance points inclinedly downwardly towards the right in FIG. 1, with a suitable drop-off or discharge angle as indicated at $\alpha$ relative to the horizontal, with the ball-shaped tip portion 16 of the lance being arranged over the processing station 52 of which only part is shown. Reference numeral 54 at the station 52 denotes the portion of glass which is dropping off the tip portion 16 of the lance 14 and which is to be subjected to further processing in the processing station 52 to provide a glass article.

As will be clearly apparent from FIG. 1, the horizontal plane 56 in which the tip portion 16 of the lance 14 is disposed during the operation of discharging the glass 54 to the processing station 52 lies above the level of the surface of the molten glass bath 18, as indicated at 58. It will be seen from FIG. 1 that there is a substantial distance between the thin dash-double-dotted lines 56 and 58 which are drawn parallel to each other.

Figure 2:
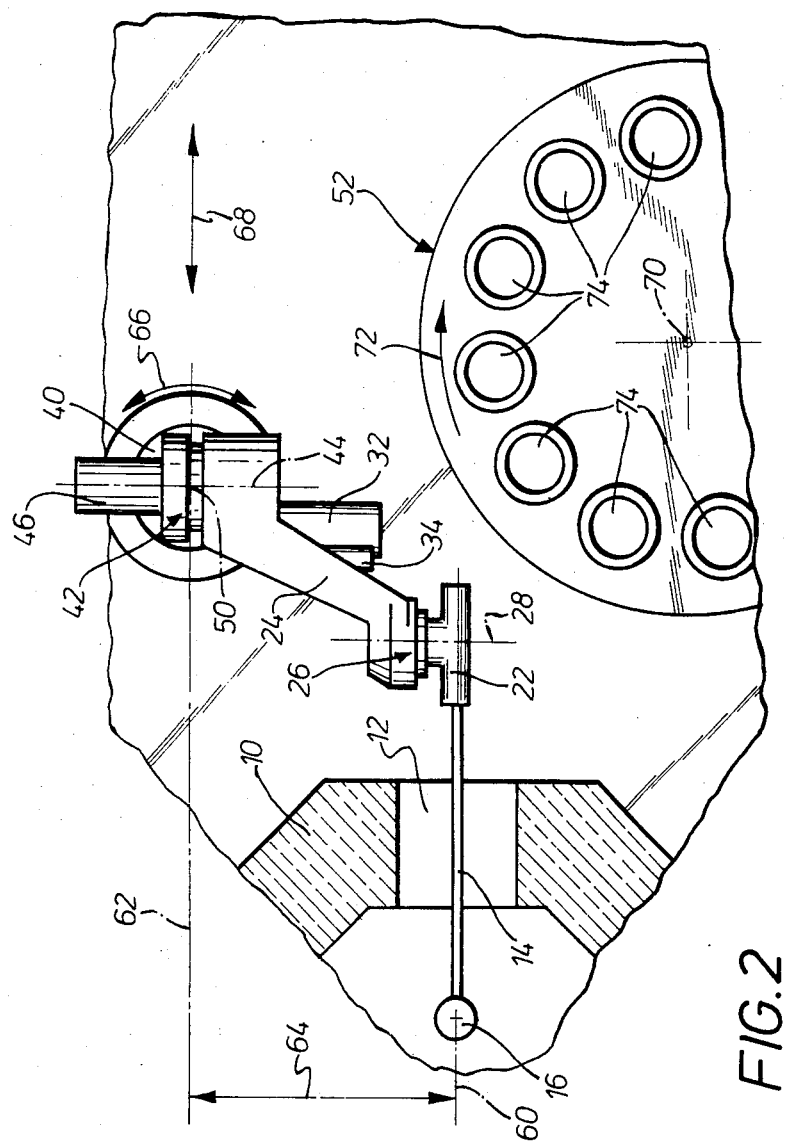
FIG. 2 is a plan view of the apparatus of FIG. 1, showing part of the wall of the glass melting furnace containing the molten bath, and the processing station.

Reference will now be made to FIG. 2 showing part of the wall 10 of the glass melting furnace, with its taphole 12. As in FIG. 1, FIG. 2 shows the lance 14 projecting through the taphole 12 and into the interior of the furnace, with the ball-shaped tip portion 16 disposed therein. The lance 14 is secured by an end portion thereof which is remote from the tip portion 16, to the fixing element 22 which is pivotally connected to the connecting element 24 by the pivot 26. The horizontal axis of the pivot 26 is shown by a dash-dotted line in FIG. 2 and is indicated at 28.

As described above, the connecting element 24 is pivotally carried on the support 40 by way of the second pivot 42 having a horizontal axis as indicated at 44. It will be clear from FIG. 2 that the axis 44 is disposed at a spacing from and extends at least substantially parallel to the horizontal axis 28.

It will also be clearly apparent from FIG. 2 that the two pivots 26 and 42 of the motion-producing or drive unit of the apparatus according to the invention are displaced relative to each other in the direction of the horizontal axes 28 and 24 of the pivots 26 and 42 in such a way that the lance 14 is pivotable in a first vertical plane and the connecting element 24 is pivotable in a second vertical plane which is spaced laterally from the first vertical plane, thereby to provide for unimpeded pivotal movement of the lance 14 about the horizontal axis 28 of the first pivot and pivotal movement of the connecting element 24 about the horizontal axis 44 of the second pivot. The first and second vertical planes in which the lance 14 and the connecting element 24 are respectively pivotable are indicated by dash-dotted lines in FIG. 2 and identified by reference numerals 60 and 62 respectively. The spacing between the vertical planes 60 and 62, corresponding to the relative lateral offset or displacement of the two pivots 26 and 42, is indicated by the arrow 64.

In FIG. 2, reference numerals 32, 34 and 36 also identify the drive motors which were described above with reference to FIG. 1 while the double-headed arrow 66 in FIG. 2 indicates that the connecting element 24 is rotatable about the vertical axis 50 of the support 40 by means of the third drive motor 46. The double-headed arrow 68 indicates that the support 40 is linearly displaceable with respect to the wall 10 of the glass melting furnace, that is to say, towards and away from the taphole 12 therein.

Reference numeral 52 in FIG. 2 again denotes the processing station which may be for example a per se known turntable-type press which is adapted to produce a stepwise rotary movement about a vertical axis 70. The stepwise rotary movement is indicated by the arrow 72 in FIG. 2. A plurality of suitable glass molds are carried on the turntable.

Figure 3:
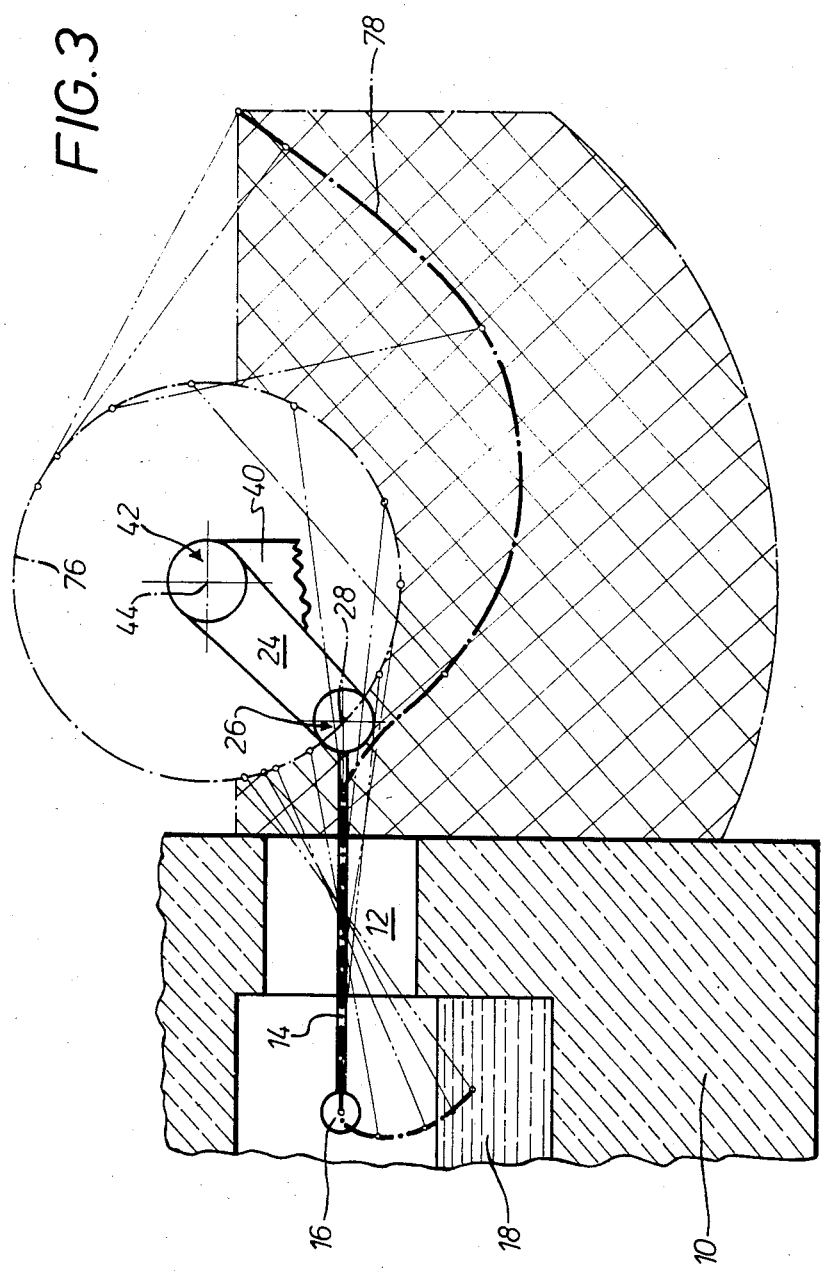
FIG. 3 is a schematized view of the apparatus of FIG. 1 showing a path of movement of the tip of the lance thereof between the molten glass bath and a processing station, as well as the total maximum possible drop-off region that can be covered by the tip of the lance.

Reference will now be made to FIG. 3 which shows part of the wall 10 of a glass melting furnace with the molten glass bath 18 therein and the taphole 12 through which the lance 14 extends with its ball-shaped end portion 16 into the interior of the furnace. In the highly diagrammatic view in FIG. 3, reference numeral 26 again denotes the first pivot between the lance 14 and the connecting element 24 and reference numeral 42 is the second pivot between the connecting element 24 and the support 40. As stated above, the pivot 26 has a horizontal axis 28 and the second pivot 42 has a horizontal axis 44. The horizontal axis 44 is virtually stationary, at least in relation to the support 40 although it will be appreciated that the support 40 may move with a linear motion as referred to above, and the horizontal axis 28, by virtue of pivotal movement of the connecting element 24, follows a circular path around the axis 44, as indicated by the dash-dotted line 76 in FIG. 3. By suitable control in respect of the pivotal movement of the lance 14 about the horizontal axis 28, as indicated by the double-headed arrow 30 in FIG. 1, the tip portion 16 of the lance 14 follows a path of movement which is indicated by the thick dash-dotted line 78 in FIG. 3, during rotational movement of the connecting element 24 about the horizontal axis 44. Thin dash-double-dotted lines in FIG. 3 indicate various positions that the lance 14 may occupy during the rotary movement thereof and the rotary movement of the connecting element 24. Furthermore, in FIG. 3, the maximum possible drop-off region that can be covered or reached by the tip portion 16 of the lance 14 is diagrammatically indicated by the portion in the drawing which is cross-hatched, assuming that the support 40 remains stationary during the appropriate rotational movements of the lance 14 and the connecting element 24. In other words, assuming that the support 40 remains in the position relative to the wall 10 as illustrated in FIG. 3, the tip portion 16 of the lance 14 can deposit glass at any point which lies in the cross-hatched area in FIG. 3.

If the support 40 is capable of performing a linear movement as indicated by the double-headed arrow 68 in FIG. 2, it will be appreciated that the glass delivery area that can be covered by the tip portion 16 of the lance 14 is increased by an amount corresponding to the extent of the linear displaceability of the support 40.

The apparatus according to the invention provides the advantage that an apparatus which is essentially reduced to the two pivot axes 28 and 24 makes it possible to cover a substantial working area, that is to say an area which can be reached by means of the lance 14, anywhere in the vertical plane indicated by reference numeral 60 in FIG. 2, and which can be increased in size in the plane 60 by the additional movement of the support 40 that may be provided, along the line indicated by the double-headed arrow 68 in FIG. 2, and which can selectively also be extended laterally around the plane 60 by the possible additional mobility of the apparatus with a rotational movement as indicated by the double-headed arrow 66 also shown in FIG. 2. It will be appreciated that at any time the lance 14 can suitably occupy an inclinedly downwardly pointing position so that the glass which has been transported out of the molten bath 18 by means of the ball-shaped tip portion 16 of the lance can be easily dropped off at a suitable processing station.

It will be appreciated that the above-described construction has been set forth solely by way of example of the principles of the present invention and that various modifications and alterations may be made therein without thereby departing from the spirit and scope thereof.

What is claimed is:

1. Apparatus for removing molten glass from a molten bath thereof which is separated from a station for processing thereof by a wall having a taphole and for transporting the molten glass to said processing station, including a lance having a front end portion adapted to be inserted through the taphole and dipped into the molten bath, and an operating means for moving the lance and comprising: a connecting element; a first pivot means connecting said lance to said connecting element; a support means disposed in front of said taphole; a second pivot means connecting said connecting element to said support means at a spacing from said first pivot means, said second pivot means being disposed on said support means at a level differing from said taphole, said first and second pivot means having at least substantially parallel and horizontal axes of pivotal movement and being displaced relative to each other in the direction of their said axes in such a way that the lance is pivotable in a first at least substantially vertical plane and the connecting element is pivotable in a second at least substantially vertical plane spaced from said first plane thereby providing for pivotal movement of said lance about the axis of said first pivot means and of the connecting element about the axis of said second pivot means without mutual impediment; a first drive motor operable to pivot the lance relative to the connecting element and disposed on said connecting element; and a second drive motor operable to pivot said connecting element relative to said support means and disposed on said support means.

2. Apparatus as set forth in claim 1 wherein said second pivot means is disposed on said support means above the level of said taphole.

3. Apparatus as set forth in claim 1 wherein said second pivot means is disposed on said support means below the level of said taphole.

4. Apparatus as set forth in claim 1 wherein said support means is stationary.

5. Apparatus as set forth in claim 1 wherein said support means is displaceable with respect to said taphole.

6. Apparatus as set forth in claim 1 wherein said support means is rotatable about an at least substantially vertical axis.

7. Apparatus as set forth in claim 1 wherein said support means is at least substantially linearly displaceable with respect to said taphole and is also rotatable about a vertical axis.

8. Apparatus as set forth in claim 1 and further including a third drive motor disposed on said connecting element for rotating said lance about the longitudinal axis of the lance.

9. Apparatus for transferring molten glass from a molten bath contained in a vessel having a taphole to a processing station disposed at a spacing from said vessel, comprising: a support means adapted to be disposed in front of said taphole; a pivot mounting means on said support means at a level differing from the level of said taphole; a connecting element pivotally mounted to said support means by said pivot mounting means; a pivot connecting means disposed on said connecting element at a spacing from said pivot mounting means; a lance pivotally connected to said connecting element by said pivot connecting means and having a tip portion adapted to be inserted through said taphole in said vessel, dipped into said molten bath to remove molten glass therefrom and moved to said station for discharge of the glass thereat, by pivotal movements of said connecting element relative to said support means and said lance relative to said connecting element, the respective pivot means having at least substantially parallel and horizontal axes of pivotal movement and the connecting element being of a cranked configuration in the direction of said axes whereby said lance is adapted to pivot about its said pivot connecting means in an at least substantially vertical plane without impediment by said connecting element; a first drive means for pivoting said lance relative to said connecting element and disposed on said connecting element; and a second drive means for pivoting said connecting element relative to said support means.

* * * * *